March 23, 1954 J. M. MacLEAN 2,672,907
RESILIENT WHEEL
Filed May 22, 1952 4 Sheets-Sheet 1
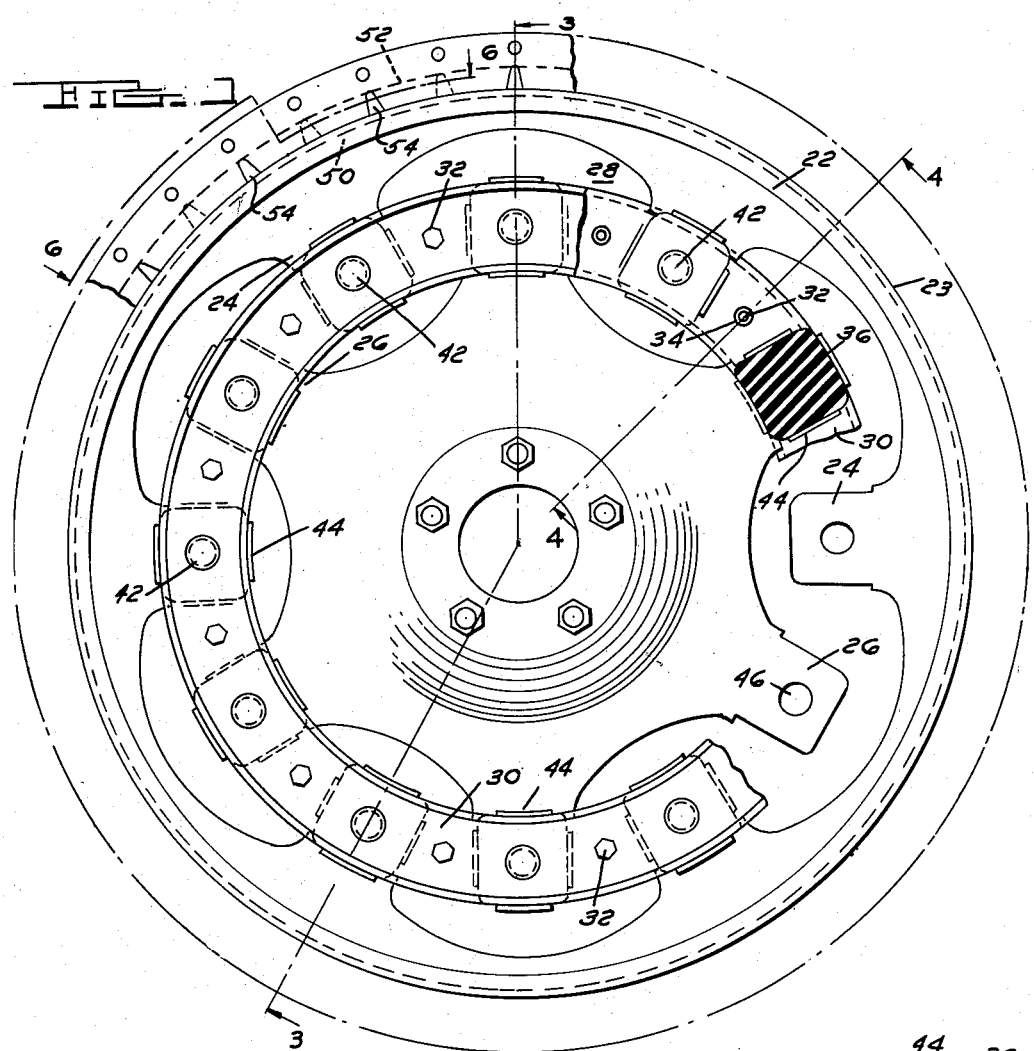
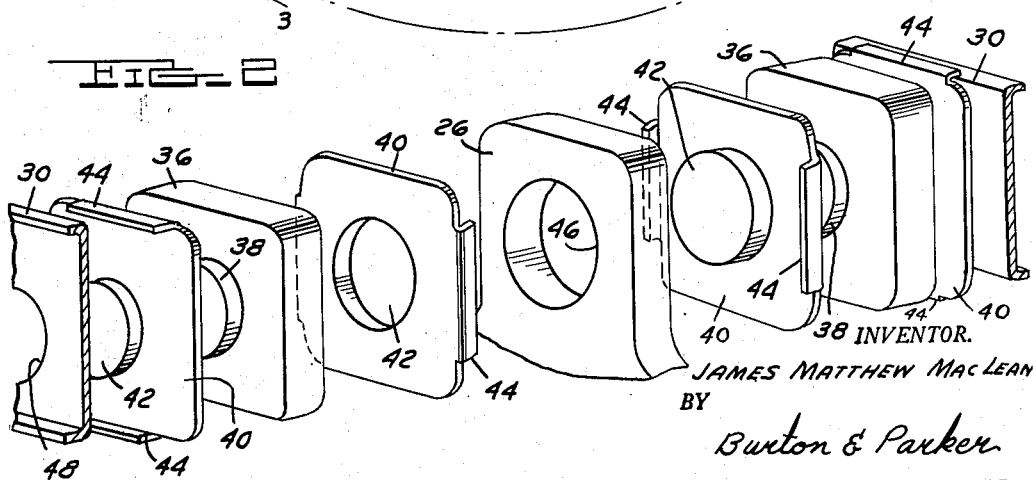
INVENTOR.
JAMES MATTHEW MacLEAN
BY
Burton & Parker
ATTORNEYS March 23, 1954   J. M. MacLEAN   2,672,907
RESILIENT WHEEL
Filed May 22, 1952   4 Sheets-Sheet 2
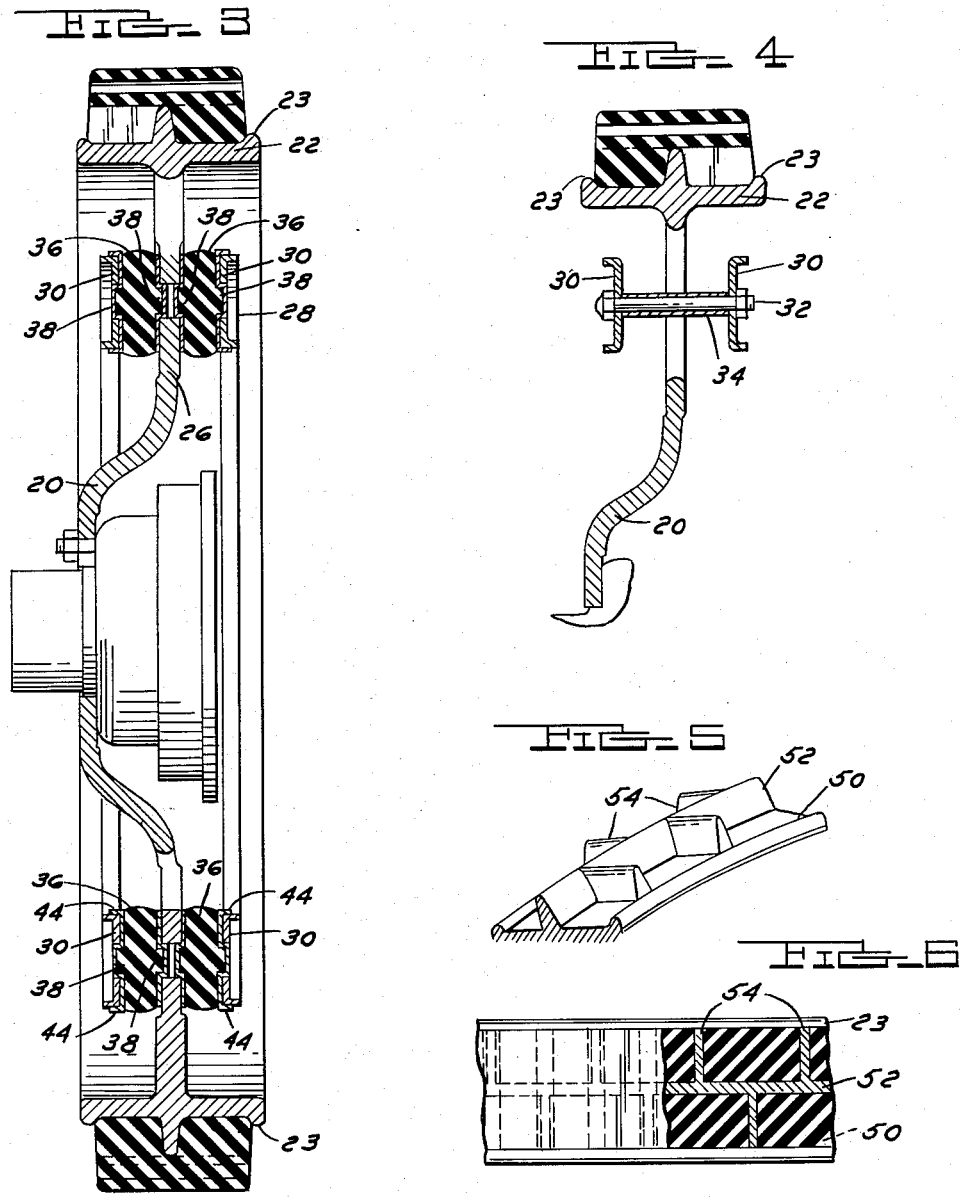
INVENTOR.
JAMES MATTHEW MacLEAN
BY
Burton & Parker
ATTORNEYS March 23, 1954  J. M. MacLEAN  2,672,907
RESILIENT WHEEL
Filed May 22, 1952  4 Sheets-Sheet 3

INVENTOR.
JAMES MATTHEW MacLEAN
BY
Burton & Parker
ATTORNEYS

March 23, 1954  J. M. MacLEAN  2,672,907
RESILIENT WHEEL
Filed May 22, 1952  4 Sheets-Sheet 4
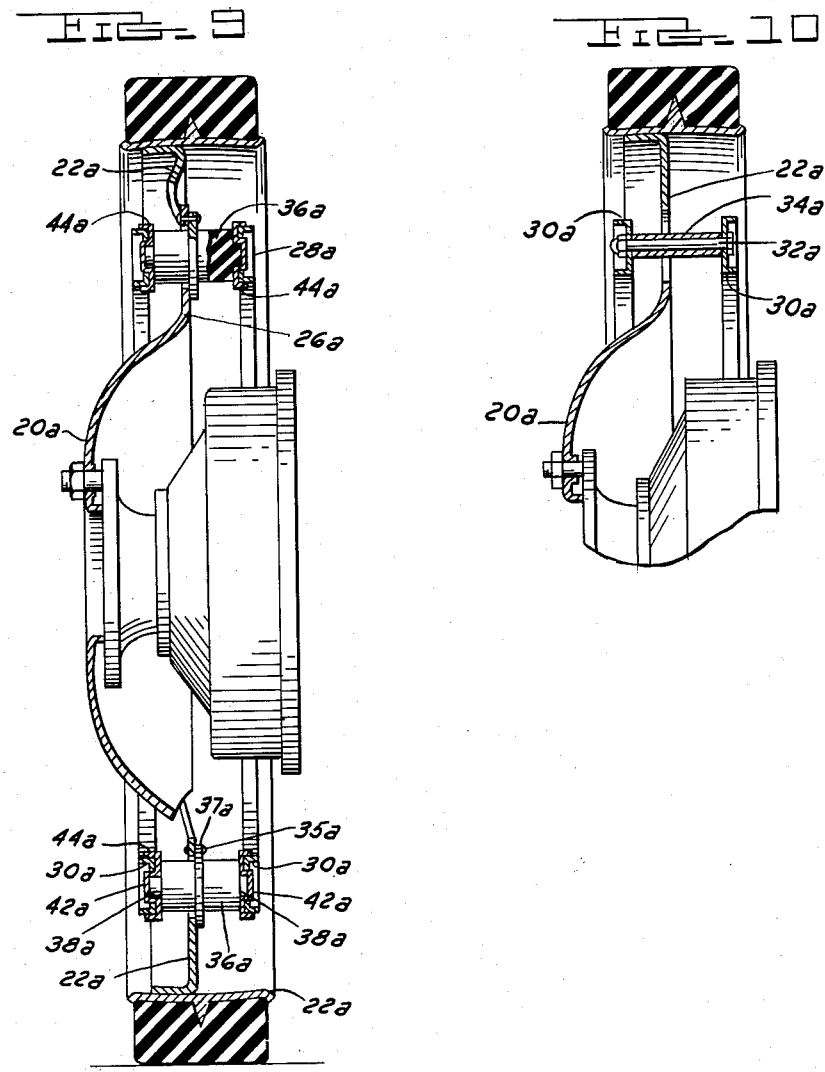
INVENTOR.
JAMES MATTHEW MAC LEAN
BY
Burton & Parker
ATTORNEYS Patented Mar. 23, 1954

2,672,907

UNITED STATES PATENT OFFICE 2,672,907

RESILIENT WHEEL

James Matthew MacLean, Windsor, Ontario, Canada, assignor to Enjar Wheels, Limited, Windsor, Ontario, Canada, a corporation of Ontario Application May 22, 1952, Serial No. 289,326

7 Claims. (Cl. 152—41)

This invention relates to a resilient wheel for a vehicle. It is particularly adapted for use on a road vehicle of the military or agricultural type.

This improved resilent wheel is designed to provide a wheel which may be employed with a solid tire thereby eliminating the pneumatic tire and a wheel which will furnish sufficient shock absorbing capacity to serve the purpose for which the wheel is intended to be used. There have been many attempts in the past to provide resilient wheels of a general character similar to that above set forth but for one reason or another such wheels have not been fully satisfactory and they have not been widely adopted or used.

An object of this invention is to provide a resilient wheel of the character hereinabove set forth which is of simple and rugged construction and which will furnish sufficient shock absorbing capacity to effectively serve its intended purpose.

More particularly, an object of this invention is to provide a resilient wheel of the character described comprising a hub portion and a tire carrying rim portion which hub and rim portions are connected together through a web assembly which web assembly embodies resilient shock absorbing means whereby the load stresses transmitted between the hub assembly and the rim assembly are absorbed and dissipated.

More specifically, the hub assembly and the rim assembly each include stub supports alternately circumferentially arranged and spaced apart and connected together through a bridging web assembly which includes resilent connecting means normally initially placed under compression to such an extent that the distortion resulting from load stresses transmitted between the hub assembly and the rim assembly are substantially taken up within the limits of the distortion produced by the compression initially imposed, whereby such resilient means are not destructively affected or broken down by use.

Another object is the provison of a resilient wheel of the character described wherein the web assembly comprises opposed complementary annular web members disposed intermediate the rim assembly and the hub assembly and on opposite sides of the projecting stub supports of said respective rim and hub assemblies. Resilient load carrying means or blocks are provided between the complementary members of the web assembly and the stub supports of the rim and the stub supports of the hub to transmit and take the load stresses between the rim and the hub. These resilient load carrying means are placed under initial compression which is maintained thereon at all times and the relative movement of the rim and hub assemblies is substantially taken up within the limits of the distortion produced by such initial compression.

Various other details and features of my improved construction will more fully appear from the following description, claims and accompanying drawings, wherein:

Fig. 1 is an elevation partly broken away of a vehicle wheel embodying my invention;

Fig. 2 is a fragmentary perspective of the resilient load carrying means and associated parts showing the same separated for purposes of clarity;

Fig. 3 is a sectional view taken on the line 3—3 of Fig. 1;

Fig. 4 is a sectional view taken on the line 4—4 of Fig. 1;

Fig. 5 is a perspective of a fragment of the road engaging surface of a tire associated with the wheel of Fig. 1;

Fig. 6 is a sectional view taken on the line 6—6 of Fig. 1;

Fig. 9 is a sectional view taken on the line 9—9 of Fig. 7;

Fig. 10 is a sectional view taken on the line 10—10 of Fig. 7;

Figure 7:
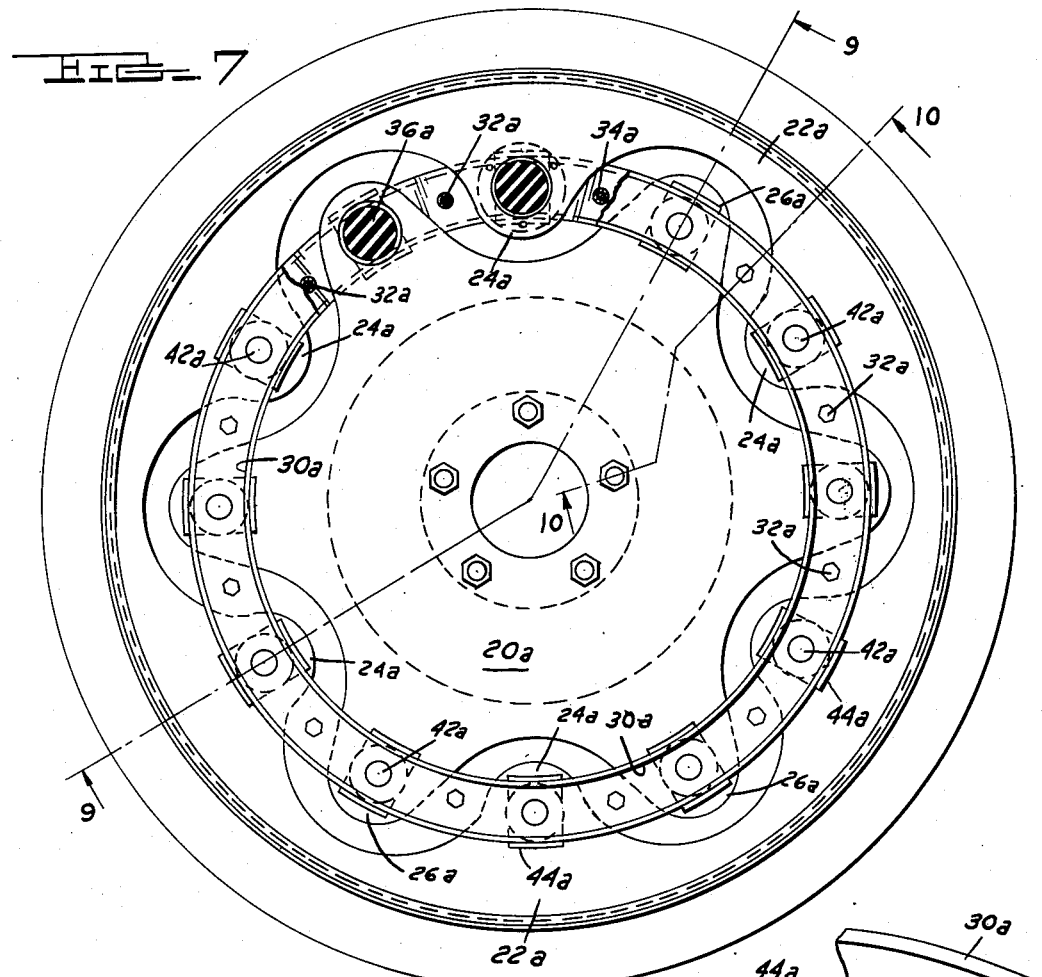
Fig. 7 is a side elevation partly broken away of a modified form of a vehicle wheel as compared with the wheel of Fig. 1.

The first four figures of the drawing illustrate a preferred modification of my improved wheel. Figs. 5 and 6 are taken on the section lines of Fig. 1 respectively but they relate to a type of tire which may be used with the wheel and such tire might be used with the construction shown in Figs. 7 trough 10 but no claim is made herein to this particular type of tire. The invention relates to the resilent wheel itself and the construction of such a wheel as hereinafter set forth.

The inventor has another application, Serial No. 251,160, filed October 13, 1951, and the instant application contains subject matter which is common to such earlier filed application and the two wheels are of the same general character.

Considering the construction of Figs. 1 through 4, the wheel comprises a hub assembly 20 and a rim assembly 22. The rim assembly is separated from the hub assembly and spaced circumferentially therefrom. The rim assembly is provided with circumferentially spaced inwardly radially projecting stub supports 24 and the hub assembly is provided with circumferentially spaced outwardly radially projecting stub supports 26. The rim assembly is so disposed relative to the hub assembly that the stub supports 24 and 26 are alternately arranged and spaced circumferentially from each other as shown in Fig. 1. The rim assembly is connected with the hub assembly through a floating web assembly. This web assembly is indicated generally by the numeral 28 and it is disposed intermediate the rim assembly and the hub assembly and connects the stub supports of the rim assembly with the stub supports of the hub assembly.

The web assembly comprises a pair of opposed complementary annular web members 30 disposed on opposite sides of the stub supports as shown particularly in Figs. 3 and 4. These web members are connected together by bolts 32. A sleeve 34 is shown in Fig. 4 encircling the bolt 32 and spacing the web members 30 the desired distance apart. This web assembly also includes resilient load carrying means in the form of resilient rubber blocks or the like 36. This resilient load carrying means forms the load transmitting connection through the web assembly between the rim assembly and the hub assembly. A resilient load carrying means or a pair of blocks is provided for each stub support. It intervenes the stub support and the two opposed complementary web members arranged on opposite sides of such stub support.

Each load carrying means is illustrated in Fig. 2 as consisting of a pair of rubber blocks 36. Rubber of appropriate character is used. Each of these blocks is provided on opposite sides with a boss formed from the material thereof and indicated as 38. A pair of metal plates 40 are provided for each rubber block 36. The two metal plates for each block are complementary. They are disposed on opposite sides of the block. Each plate is provided with a cup-shaped recess or part 42 of a size and so disposed as to receive the boss 38 on the adjacent side of the block, as shown particularly in Fig. 3.

Each plate 40 is provided with a pair of marginal flanges 44. These flanges project from the two opposite margins of the plate as shown particularly in Fig. 2. The marginal flanges 44 of the plates which are disposed between the blocks and the web members 30 have their flanges 44 engaged over the opposite edges of the web members as shown to hold the plate against rotation relative to the web members. The plates 40 which lie between the blocks 36 and the stub support 26 have their flanges 44 engaged over the opposite edges of the stub support so as to hold these plates against rotation relative to the stub support. The two plates 40 are bonded to the rubber blocks 36 upon opposite sides thereof in any suitable manner which will provide secure attachment therebetween.

The cup-shaped parts 42 on the plates which lie adjacent the stub support 26 extend into an aperture 46 provided in such stub support. The cup-shaped parts 42 which are provided on the plates 40 which lie adjacent the web members 30 extend into apertures 48 provided in such web members, as shown particularly in Figs. 2 and 3.

It is to be understood that the resilient load carrying means just described and shown in exploded form in Fig. 2 is provided for each stub support of the rim and for each support of the hub. Each stub support is connected through such resilient means with the web assembly.

Bolts 32 provided with sleeves 34, which sleeves extend between the web members as shown particularly in Figs. 1 and 4, connect the web members together and impose substantial compression initially upon the rubber blocks 36. It has heretofore been stated that these rubber blocks 36 are bonded between the plates 40. In the assembly of the wheel the two annular members which make up the web assembly are fastened together by the bolts 32 and tightened toward each other. The rubber blocks are distorted by this compression. This initial compression is such that the distortion produced thereby is presumably sufficient to absorb substantially all of the distortion resulting from relative movement between the rim assembly and the hub assembly by travel of the wheel over the road under load. As a result of this fact, the rubber blocks are not destructively deteriorated and are not torn loose from the plates and the wheel is enabled to perform its useful function over a long period of time.

As stated the rubber used in the blocks is such as possesses the desired resilient character and strength and is long wearing. Such blocks may be initially compressed as much as one-third between the web members.

The modification shown in Figs. 7 through 10 is very similar to the construction described in the first four figures of the drawing. There is a hub part 20$^a$ and a rim assembly 22$^a$. The rim assembly is provided with circumferentially spaced radially inwardly projecting stub supports 24$^a$. The hub assembly is provided with circumferentially spaced radially outwardly projecting stub supports 26$^a$. There is a floating web assembly 28$^a$ which connects the rim assembly and the hub assembly together.

Figure 8:
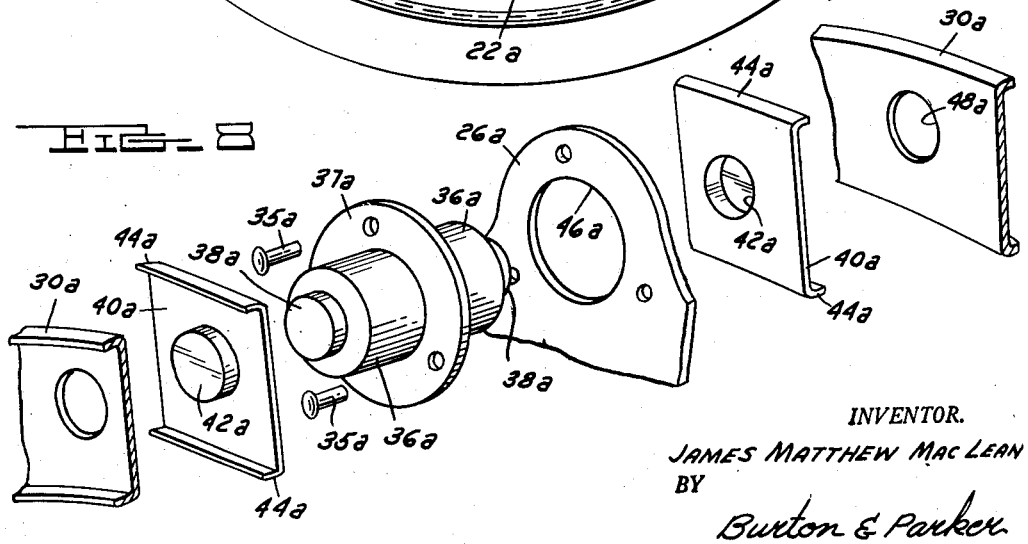
Fig. 8 is a perspective of a fragment of that portion of the wheel embodying the resilient load carrying means and associated parts showing the same separated for purpose of clarity.

This web assembly is made up of a pair of opposed complementary annular web members 30$^a$. These web members are held together by bolts 32$^a$ provided with surrounding sleeves 34$^a$. There is provided a pair of rubber blocks 36$^a$ which blocks are bonded to opposite sides of a flange or plate 37$^a$ as shown in Fig. 8. These two blocks 36$^a$ and flange 37$^a$ constitute a resilient means which serves to connect the stub support to the floating annular web assembly through the web members 30$^a$. The flange 37$^a$ is shown in Fig. 8 as secured to the stub support 26$^a$ by means such as rivets 35$^a$. One rubber block 36$^a$ extends through an aperture 46$^a$ in the stub support 26$^a$.

A pair of plates 40$^a$ provided with cup-shaped recesses or parts 42$^a$ are disposed on opposite ends of the rubber blocks 36$^a$. Each rubber block 36$^a$ is provided on opposite ends with bosses 38$^a$ which bosses are received within the cup-shaped recesses 42$^a$, as shown in Fig. 9. These two blocks are bonded to the flange 37$^a$ and provided with end plates 40$^a$ to which the blocks are also bonded. Such two blocks, flanges and plates constitute resilient load carrying means intervening the stub supports and the annular web assembly members. The web assembly members are provided with apertures 48$^a$, wherein cup-shaped parts 42$^a$ of the plates 40$^a$ are received as shown in Fig. 9. The plates 40$^a$ are provided on opposite marginal edges with flanges 44$^a$ which are adapted to be engaged over the opposite edges of the annular web members 30$^a$ as shown in Fig. 9.

Structurally the construction of this modification exhibited in Figs. 7 through 10 is very similar to the construction shown in Figs. 1 through 4 but differs therefrom in that the flange 37$^a$ is riveted to its stub support. It is offset the plane of its stub support. It takes the place of the two plates 40 which are bonded to the two blocks 36 and their cup-shaped portions received within the opening 46 of the stub support 26 in Fig. 1. Figs. 1 through 4 constitute the preferred modification.

A solid rubber tire suitable for use on the wheel construction of either modification as shown in Figs. 5 and 6 comprises an annular rim engaging part 50$^a$ provided with outwardly projecting ridges 52$^a$ and 54$^a$. The part 50$^a$ seats between the outward flanges 23$^a$ formed on the rim 22$^a$ as shown in Figs. 3 and 4.

What I claim is:

1. A resilient wheel comprising, in combination, a hub assembly provided with circumferentially spaced outwardly radially projecting stub supports, a separate rim assembly provided with circumferentially spaced inwardly radially projecting stub supports, said hub and rim so relatively disposed that their respective stub supports are arranged alternately and in spaced relationship, a floating annular web assembly disposed intermediate the hub and the rim and overlapping the stub supports thereof, said web assembly including a pair of opposed complementary annular web members, resilient load carrying means connecting each stub support with the pair of opposed complementary annular web members, and a pair of plates secured to opposite ends of each of said resilient means, each of said plates provided with openings therein, each of said means provided at opposite ends with bosses received within the openings in the plates, each of said plates provided with parts engaging said web members holding the plates against rotation relative to said web members.

2. A resilient wheel comprising, in combination, a hub assembly provided with circumferentially spaced outwardly radially projecting stub supports, a separate rim assembly provided with circumferentially spaced inwardly radially projecting stub supports, said hub and rim so relatively disposed that their respective stub supports are arranged alternately and in spaced relationship, a floating annular web assembly disposed intermediate the hub and the rim and overlapping the stub supports thereof, said web assembly including a pair of opposed complementary annular web members, resilient load carrying means connecting each stub support with the pair of opposed complementary annular web members, and a pair of plates secured to opposite ends of each of said resilient means, each of said plates provided with a cup-shaped recess formed therein each of said means provided on opposite ends with a boss seated within a cup-shaped recess of the plate at such end, each of said plates provided with marginal flanges engaged over the two opposite edges of the annular members holding the plates against rotation relative thereto.

3. A resilient wheel for a vehicle as defined in claim numbered 2, characterized in that the resilient means which connects each stub support with the web assembly is connected with the stub support by a plate secured to said means and secured to the support against rotation relative thereto.

4. A resilient wheel comprising, in combination, a hub assembly provided with circumferentially spaced outwardly radially projecting stub supports, a separate rim assembly provided with circumferentially spaced inwardly radially projecting stub supports, said hub and rim so relatively disposed that their respective stub supports are arranged alternately and in spaced relationship, a floating annular web assembly disposed intermediate the hub and the rim and projecting stub supports thereof, said web assembly including a pair of opposed complementary annular web members disposed on opposite sides of the stub supports, a pair of resilient blocks for each stub support disposed one on each side thereof between the support and the adjacent web member, a pair of plates disposed on opposite sides of each block connected therewith and engaged respectively with the stub support and with the adjacent web member, each plate being provided with a cup-shaped part, and each block being provided with two bosses received within the cup-shaped portion of the two plates disposed on opposite sides of the block.

5. A vehicle wheel as defined in claim numbered 4, characterized in that each stub support is provided with an aperture within which the cup-shaped portions of the two plates disposed on opposite sides of the stub supports are received and said two plates are provided with flanges engaging the opposite edges of the stub support holding the plates against rotation relative thereto.

6. A vehicle wheel as defined in claim numbered 4, characterized in that each stub support is provided with an aperture within which the cup-shaped portions of the two plates disposed on opposite sides of the stub support are received, the two web members are provided with apertures within which the cup-shaped portions of the plates adjacent the web members are received and the abutting portions of each stub support and the two plates disposed on opposite sides thereof are so formed that the plates are interengaged with the stub support and held against rotation relative to the stub support and the abutting portions of each plate and adjacent web member are so formed and interengaged that the plate is held against rotation relative to said web member.

7. A vehicle wheel as defined in claim numbered 4, characterized in that each stub support is provided with an aperture within which the cup-shaped portions of the two plates disposed on opposite sides of the stub support are received, the two web members are provided with apertures within which the cup-shaped portions of the plates adjacent the web members are received, and the plates adjacent each stub support are provided with flanges engaging the opposite edges of the support and the plates adjacent the web members are provided with flanges engaging the opposite margins of the web members holding the plates against rotation relative to the stub support and relative to the web members, and connecting means are provided extending between said members tensioning them against the resilient blocks holding said blocks normally under compression substantially sufficient to absorb within the distortion produced thereby the load stresses transmitted between the rim assembly and the hub assembly.

JAMES MATTHEW MacLEAN.

References Cited in the file of this patent

UNITED STATES PATENTS

| Number | Name | Date |
|---|---|---|
| 519,807 | Cloud | May 15, 1894 |
| 2,528,156 | Maiorca | Oct. 31, 1950 |

FOREIGN PATENTS

| Number | Country | Date |
|---|---|---|
| 651,007 | Great Britain | Mar. 7, 1951 |